(12) United States Patent
Harper et al.

(10) Patent No.: US 7,103,762 B2
(45) Date of Patent: Sep. 5, 2006

(54) USING A CACHE AND DATA TRANSFER METHODOLOGY TO CONTROL REAL-TIME PROCESS DATA IN A PXE PRE-BOOT MANUFACTURING ENVIRONMENT

(75) Inventors: John Gary Harper, Cary, NC (US); Barry Alan Kritt, Creedmoor, NC (US); Pamela Annette Morse, Durham, NC (US); Linda Reed Newton, Oxford, NC (US); Paul Allen Roberts, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 10/248,618

(22) Filed: Jan. 31, 2003

(65) Prior Publication Data

US 2004/0153637 A1    Aug. 5, 2004

(51) Int. Cl.
*G06F 15/177*    (2006.01)
(52) U.S. Cl. .......................................... 713/1; 713/100
(58) Field of Classification Search ............... None
See application file for complete search history.

(56) References Cited

U.S. PATENT DOCUMENTS

| | | | |
|---|---|---|---|
| 4,751,727 A * | 6/1988 | Brahm et al. ................ | 379/28 |
| 5,325,529 A | 6/1994 | Brown et al. | |
| 5,444,850 A | 8/1995 | Chang | |
| 5,680,547 A | 10/1997 | Chang | |
| 6,317,826 B1 | 11/2001 | McCall et al. | |
| 6,421,777 B1 | 7/2002 | Pierre-Louis et al. | |
| 6,463,530 B1 | 10/2002 | Sposato | |
| 6,580,715 B1 * | 6/2003 | Bare ........................... | 370/396 |
| 6,671,259 B1 * | 12/2003 | He et al. ..................... | 370/238 |
| 6,754,706 B1 * | 6/2004 | Swildens et al. ............ | 709/225 |
| 6,826,606 B1 * | 11/2004 | Freeman et al. ............ | 709/223 |
| 2002/0078188 A1 | 6/2002 | Anand et al. | |
| 2002/0161452 A1 * | 10/2002 | Peltier .......................... | 700/2 |
| 2003/0061323 A1 * | 3/2003 | East et al. ................... | 709/223 |

FOREIGN PATENT DOCUMENTS

| | | |
|---|---|---|
| JP | 11-328137 A | 8/2000 |
| JP | 2001-356913 A | 12/2001 |
| JP | 2002-123400 A | 4/2002 |
| JP | 2002-169694 A | 6/2002 |

OTHER PUBLICATIONS

Richichi, M. et al, "Supporting Ubiquitous Computing Through Directory Enabled Technologies," SIGUCCS, Oct. 17-20, 2001, pp. 157-163.
Ferri, R., "Remote Linux Explained," .linuxjournal.com/article.php?sid=5465, Jan. 1, 2002, pp. 1-9.

(Continued)

*Primary Examiner*—Thuan Du
(74) *Attorney, Agent, or Firm*—Sawyer Law Group LLP

(57) ABSTRACT

A method and system for caching and moving the required real-time, processing unit specific data (including boot image selection) among isolated servers in a pre-boot environment is disclosed. A system and method in accordance with the present invention provides a network/server topology that includes a common control server, and a plurality of isolated process servers. A system and method in accordance with the present invention provides the capability of being able to reference the real-time processing unit specific data based on either the unique processing unit identifier (MTSN directory name) or based on the MAC address (in conjunction with the content of a MAC binding file).

20 Claims, 7 Drawing Sheets

OTHER PUBLICATIONS

Ferri, R., "The Oscar Revolution," .linuxjournal.com/article.php?sid=5559, Jun. 1, 2002, pp. 1-6.
"JavaOS Multiple Boot Server (Win32) Support with Priority," Research Disclosure, Sep. 1999, p. 1234.
"Post-boot PXE Client," Research Disclosure, Feb. 2002, p. 342.

Paul, CJ et al, IBM Dossier AUS920000592US1, U.S. Appl. No. 09/740,565, "Method, Apparatus and Program for Server Based Network Computer Load Balancing Across Multiple Boot Services," filed Dec. 18, 2000.

* cited by examiner

USING A CACHE AND DATA TRANSFER METHODOLOGY TO CONTROL REAL-TIME PROCESS DATA IN A PXE PRE-BOOT MANUFACTURING ENVIRONMENT

FIELD OF THE INVENTION

The present invention relates generally to a processing unit and more particularly to a method for allowing a processing unit which does not have a storage medium to receive an appropriate boot image in a manufacturing environment.

BACKGROUND OF THE INVENTION

A boot method is available for personal computers (PCs) which allows a PC to obtain its boot image from a network server instead of local storage media (such as floppy disks, hard drives, or CDROMs). This capability is commonly referred to as a preboot protocol. An example of such a preboot protocol is Preboot Execution Environment (PXE) by Intel Corporation. Units supporting this capability can boot an operating system even if there is no local storage media on the processing unit, or if that local storage media is unavailable (for example, if the media has not been prepared/formatted, or if the media is storing other information that cannot be modified).

This preboot protocol boot capability provides a great deal of flexibility. Since there is a preboot image that is downloaded (across the network) and executed, there is a capability for this preboot image to determine information about the processing unit that is booting, and make dynamic decisions (such as which OS boot image to pull from the network and boot).

Some of the preboot protocol capabilities are particularly interesting to PC manufacturers and software installers, since the processing units they are building/configuring may not have local storage media at all, or may have media that does not yet have an operating system loaded. In addition, in a manufacturing environment it may be necessary to boot with different operating system environments at various points in the process, since the diagnostic software, system preparation tools (such as CMOS configuration and flash programming software), and OS preload tools may run under different operating system environments.

There are several problems that arise, however when using the preboot protocol. They are described in detail herein below.

1. Movement of Processing Units between Servers within the Process

The process of configuring, testing, and preloading a processing unit is a sequential process that requires steps to be performed according to a predefined state flow. Since the processing unit being configured may be rebooted or powered down during the process, the sequence of steps to be performed for that particular processing unit as well as certain real-time information unique to that processing unit (such as which steps have been processed and other unique log information) must be kept in nonvolatile storage. In cases where there is no local storage media, the information would need to be kept on a server, in a storage area-that is unique for the processing unit being processed. A problem can occur, however, if during the process the processing unit needs to be moved from one server to another, and if the unique storage location is not accessible from both servers. Changing servers could be necessary if some of the servers are specialized for a particular type of activity in the process (such as preload servers which are able to quickly supply large amounts of data for preloading OS and applications, or debug servers that have specialized debug hardware or software). If the processing unit is moved to a new server, the real-time state information is no longer available. This would mean that the processing unit would need to start at the beginning of the process again.

2. Need to Support Multiple OS Boot Image Selection

Another complication is the fact that since during the process it may be necessary to boot with different operating system environments, the unique data storage area also has the information on which OS boot environment it will need to boot for the next operational step in the sequence if the processing unit being processed is moved to a new server, it will not only not have access to the previous state information, but will not be able to determine which OS boot image (based on the needed OS environment) it needs to boot for the current operation.

3. Self-Determination of a Unique Identifier for a Processing Unit

Another problem facing manufacturers and configurators is the self-determination of the identity of the processing unit during the pre-boot period. Having a unique identifier is imperative since the unique data storage area on the server will be accessed based on this identifier. Since the manufacturer may not have programmed a unique identifier (such as a Unit Type/Serial Number or a UUID (Universal Unique Identifier) into the processing unit, the only unique number that the processing unit can assuredly read is the MAC Address (Media Access Control Address as defined by the OSI Reference Model Standard) of the network card that is being used for the preboot protocol boot. The problem with using the MAC address of the network adapter as the unique identifier is that in some cases the network adapter may be reused between processing units being configured (for instance if the processing units do not ship to customers with the network adapter, and the network adapter is being used as a test device), or if the network adapter fails during the process and is replaced with another adapter.

4. Ability to Associate the Unique Identifier with Information Supplied by a Floor Control System Also related to the above item, is the fact that most floor control systems in a manufacturing environment will control the process using information such as machine type and/or serial number (referred to as MTSN directory name information). The floor control system will have information such as the bill of material, and the sequence of configuration/test sequence and parameters required for the processing unit. This information will be stored on one of the process servers, and can only be referenced by the MTSN directory name (the floor control system does not know the MAC Address for the network card adapter since the MAC Address is programmed into the network card adapter, and is not externally visible/scannable).

As mentioned above, it cannot be assumed that the processing unit can determine its own MTSN directory name; it can only determine its current MAC Address. Therefore, there needs to be a mechanism for associating (and disassociating) a MAC Address with an MTSN directory name.

Accordingly, what is needed is a system and method for controlling real time process data in a preboot manufacturing environment that overcomes the above-mentioned problems. The present invention addresses such a need.

BRIEF SUMMARY OF THE INVENTION

A method and system for caching and moving the required real-time, processing unit specific data (including boot image selection) among isolated servers in a pre-boot environment is disclosed. A system and method in accordance with the present invention provides a network/server topology that includes a common control server, and a plurality of isolated process servers. A plurality of processing units (computers) are coupled to each of the plurality of isolated process servers.

A system and method in accordance with the present invention allows each of the processing units below an isolated process server to be set up with identical IP addresses (reducing administration costs) and also eliminates manufacturing wide network problems (caused by failing network cards) by isolating the segments rather than routing the segments. As a result, this invention provides a more fault tolerant network and a lower total cost solution.

A system and method in accordance with the present invention provides capabilities for processing units to be moved between isolated servers (servers that the processing unit cannot access since they are on unrouted subnets).

A system and method in accordance with the present invention provides the capability of being able to reference the real-time processing unit specific data based on either the unique processing unit identifier (MTSN directory name) or based on the MAC address (in conjunction with the content of a MAC binding file).

DETAILED DESCRIPTION OF THE INVENTION

The present invention relates generally to a processing system and more particularly to a method for allowing a processing system which does not have a storage medium to receive an appropriate boot image in a manufacturing environment. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
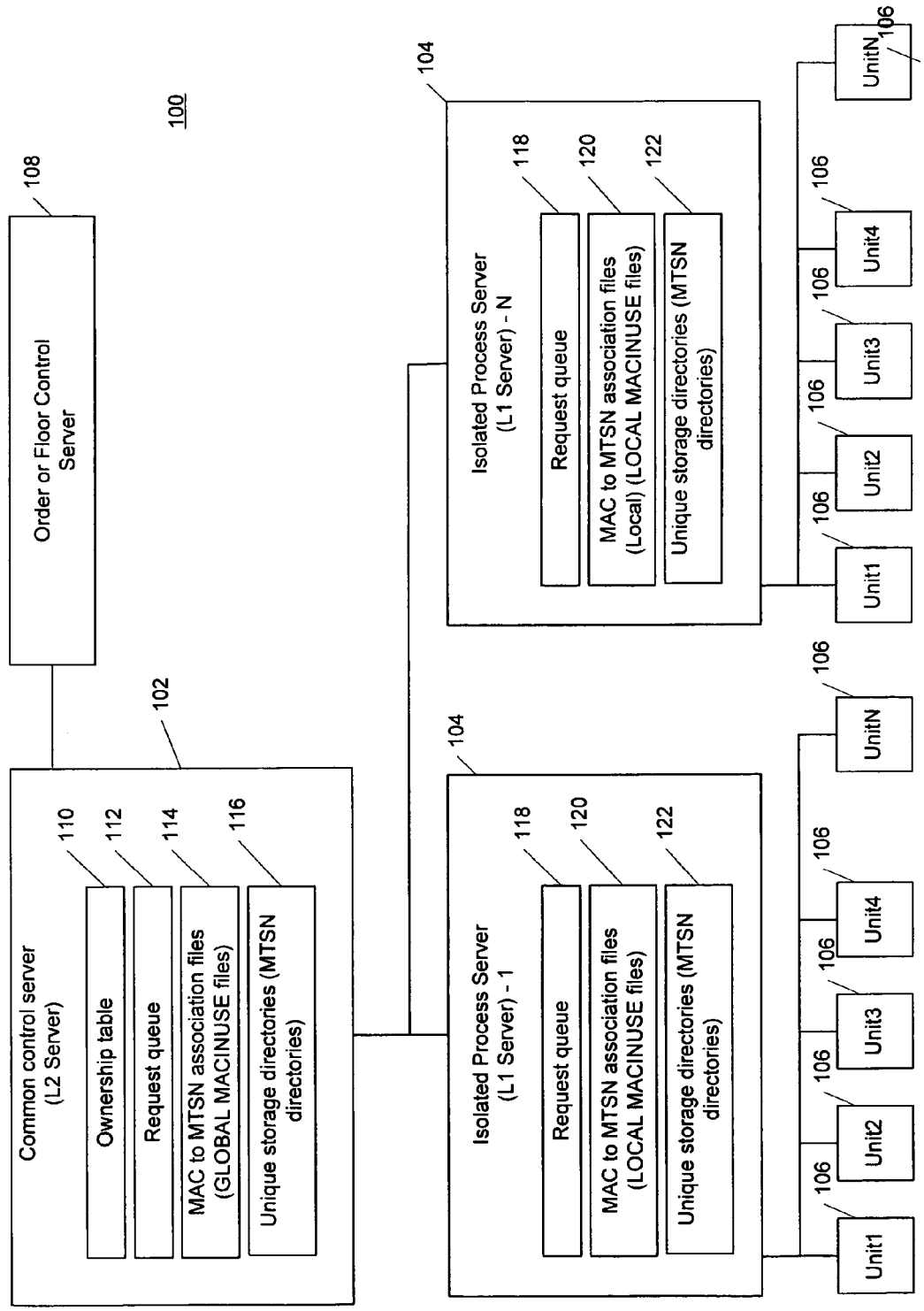
FIG. 1 illustrates a network server topology utilized in a manufacturing environment for transferring a preboot image in accordance with the present invention.

FIG. 1 illustrates a network server topology utilized in a manufacturing environment for transferring a preboot image in accordance with the present invention. The network/server topology 100 includes a common control server 102, and a plurality of isolated process servers 104 (which can access the common control server 102, but not other isolated process servers 104). Each of the isolated process servers 104 are coupled to one or more processing units 106 to be prebooted. In a preferred embodiment, the common control server 102 is higher in the server hierarchy than any of the isolated process servers 104, and the isolated process servers 104 are higher in the server hierarchy than the processing units 106 that are being tested, configured or preloaded. The common control server 102 is also connected to an order or floor control server 108.

The common control server 102 includes an ownership table 110, a request queue 112, a plurality of global MAC to MTSN directory name association files (Global MACINUSE files 114) and a plurality of global unique storage directories (MTSN directories) 116.

Each of the isolated process servers 104 includes a request queue 118, a plurality of local MAC to MTSN directory name association files (local MACINUSE files 120) and local unique storage directories (MTSN directories) 122.

In the present invention, the isolated process servers 104 can access the common control servers 102, but not other isolated process servers 104. The common control server 102 can access any of the isolated process servers 104. The processing units 106 can access their isolated process server 104, but not the common control server 102 or any other isolated process server 104. This would likely be the case if there was no IP routing between the network that contains the processing units 106 and the network that connects the servers. (Elimination of this routing allows simpler network configuration on the many isolated process servers 104 and networking switches used in a high-volume manufacturing environment).

This Topology has the Following Advantages:

(1) Use of a unique storage directory (MTSN directory name) name based on a processing unit 106 type and serial number or other identifier (which is known by a floor control system) for the processing unit 106 being processed. This allows content to be added to the MTSN directory by the floor server 108 before the processing unit 106 is introduced into the process. This is key, since the floor control system does not have access to the MAC address in many cases.

(2) Use of a binding file which is named based on a MAC address. The binding file (referred to herein also as association file) associates the processing unit 106's MAC file with its unique storage directory (MTSN directory name) and is readable by the processing unit 106 at pre-boot time. This is key, since the processing unit 106 cannot determine its MTSN directory name at pre-boot time, but can determine its MAC address. This file provides capability for (a) the processing unit 106 to determine its MTSN directory name, (b) the processing unit 106 to determine whether the MTSN directory is available on the current server, and (c) for the processing unit 106 to access the MTSN directory to obtain its real-time state information (including which OS image it should boot).

(3) Use of movement request files which are named based on a MAC address. This enables a processing unit 106 (at pre-boot time) to request its unique storage directory (MTSN directory) be moved if it is not available on the current server. This capability is key, since (a) the processing unit 106 is unaware of its MTSN directory name at pre-boot time, (b) the processing unit 106 can only determine its MAC address and create a file based on the MAC address, and (c) the processing unit 106 does not have access to its MTSN directory if it resides on an isolated server.

(4) The use of the specified network topology and server based software to process/track the movement requests of MTSN directories among the isolated process servers 104. Each of these advantages will be described in detail herein below.

The network server topology 100 is utilized to allow for a processing unit 106 without a storage medium to be readied to load. To describe the key features of this, refer now to the following discussion in conjunction with the following figures.

Figure 2:
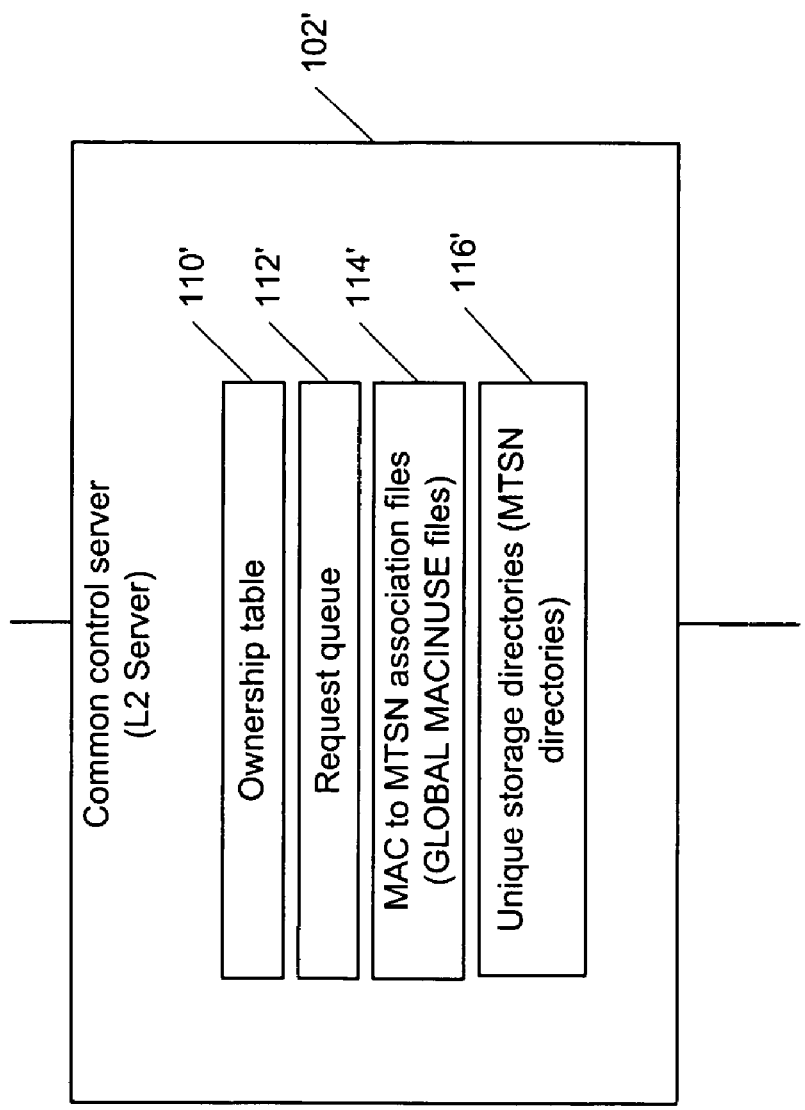
FIG. 2 is a block diagram of the resources for the common control server.
Figure 3:
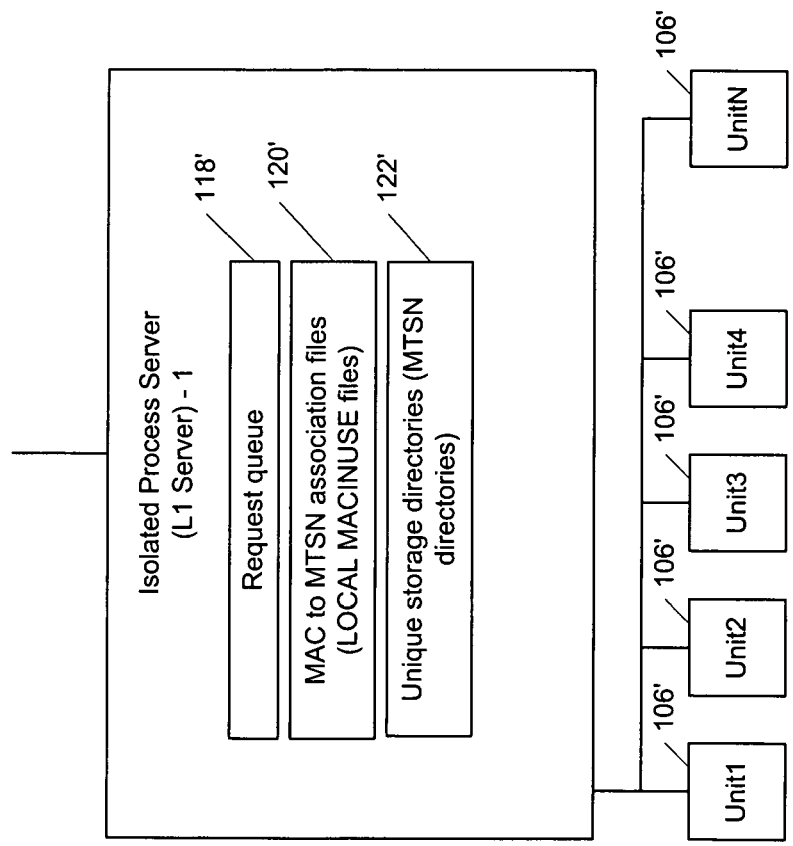
FIG. 3 is a block diagram of the resources of one isolated process server.

The general configuration of the servers 102 and 104 and the resources of each of the servers are also illustrated in FIGS. 2 and 3. FIG. 2 is a block diagram of the resources of the common control server 102. The common control server 102 includes an ownership table 110', a request queue 112', a plurality of global MAC to MTSN directory name association files (Global MACINUSE files 114') and unique storage directories (MTSN directories 116').

FIG. 3 is a block diagram of the resources of one isolated process server 104'. Each of the isolated process servers 104' includes a request queue 118', a plurality of local MAC to MTSN directory name association files (local MACINUSE files 120') and local unique storage directories (MTSN directories) 122'.

Figure 4:
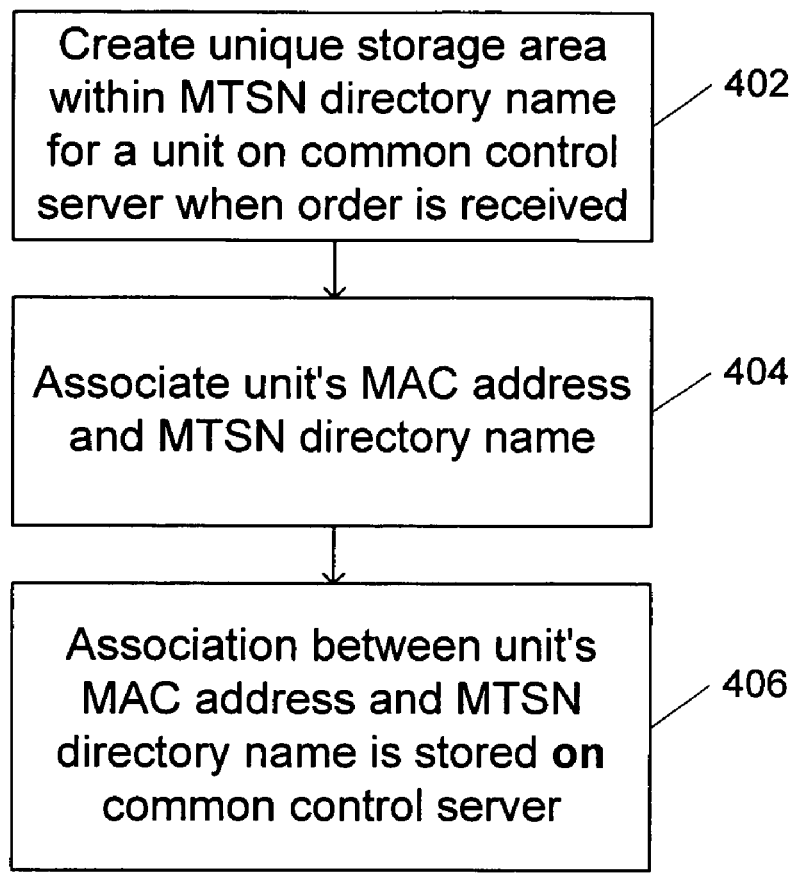
FIG. 4 is a flow chart which illustrates preparing for a processing unit for a preboot procedure using the network topology.

FIG. 4 is a flow chart which illustrates preparing for a processing unit 106 preboot procedure using the network topology 100. Referring now to FIGS. 1 and 4 together, first a MTSN directory is created for a processing unit 106 on the common control server 102 at the time an order is received, via step 402. The MTSN directory name is based on the processing Unit Type/Serial Number or some other unique identifier for the processing unit 106.

At a point in time before a processing unit 106 is started, there is a transaction (usually from an order processing system or floor control server 108) that will indicate a processing unit 106 is entering the process, and will have the MTSN directory name identifier, and information about the MTSN processing unit 106 (such as a bill of materials, and other assembly, configuration, preload, and test information).

This transaction should initiate the creation of a MTSN directory on the common control server 102, and the population of this MTSN directory with the required information to run the process (such as bill of materials, programs to run, list of programs to run, the sequence of operations, information on the operating system environment that should be booted at various points in the process, etc.).

Next, the processing units 106 MAC address and the MTSN directory name are associated, via step 404. The association of the MAC address and the MTSN directory name can be accomplished by either:

(1) Scanning in the MTSN directory name and scanning in the MAC address (assuming it is printed in a scannable format)

(2) Scanning in the MTSN directory name and sniffing the MAC address from an IP packet.

This method is preferable in many cases since it does not require the MAC address to be printed in a bar-code scannable label, and also eliminates the (very real) possibility that the MAC address on the bar-code label is incorrect, and does not actually match the MAC address that has been programmed into the device.

Next, the association between the processing units 106 MAC address and MTSN directory name is stored using a unique file in the common control server 102, for example, in the Global MACINUSE directory 114, via step 406. For example, the file name would be nnnnnnnn.MAC (where nnnnnnnn is the 8 significant digits of the MAC address) to store the MTSN directory name.

The processing unit 106 will need to be able to determine its MTSN directory name (at preboot and postboot time). During the process, the processing unit 106 may not have any way to determine its own MTSN directory name (since it may not have been programmed into the system). It can determine its MAC address, and can TFTP (Trivial File Transfer Protocol) a file. By storing the MTSN directory name in a file which is named based on the MAC address, the processing unit 106 can determine which file has its MTSN directory name.

Accordingly, once this association is made and stored in the common control server 102, any processing unit 106 can be prebooted with the appropriate data. Thereafter the boot image can then be provided utilizing the network topology 100 of FIG. 1.

Figure 5:
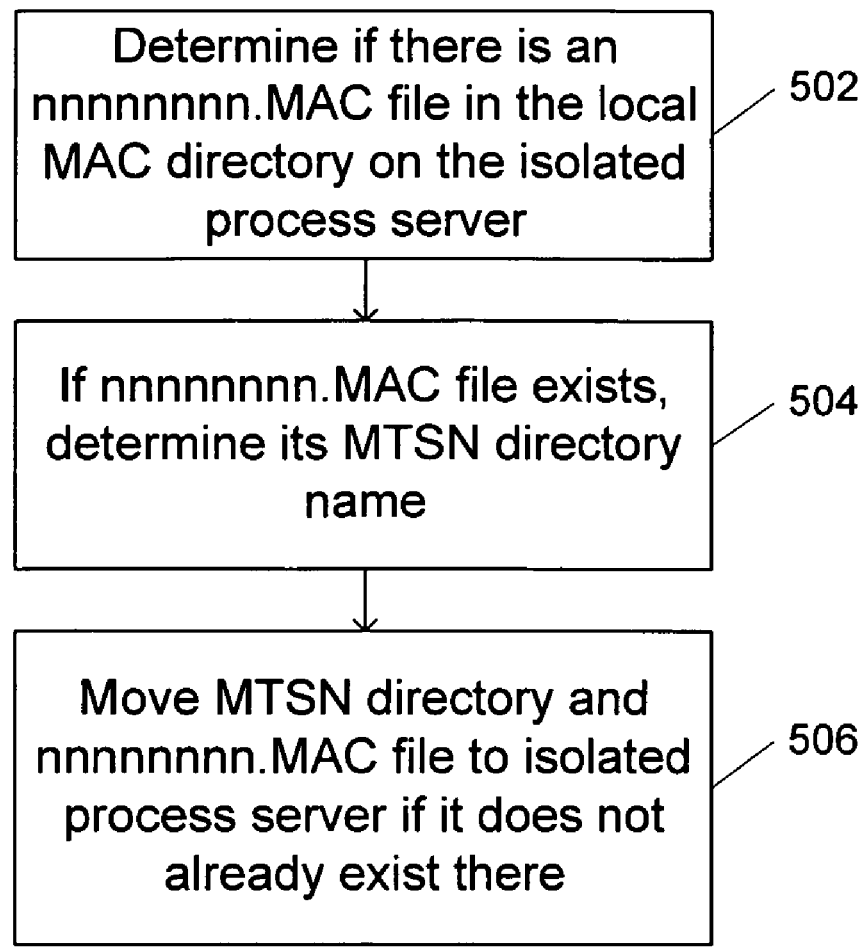
FIG. 5 is a flow chart which illustrates setting up a processing unit to receive the boot image.

FIG. 5 is a flow chart which illustrates setting up a processing unit 106 to receive the boot image. Referring now to FIGS. 1 and 5 together, when a processing unit 106 is ready for prebooting, it is first determined if there is an nnnnnnnn.MAC file in the local MAC directory, (and therefore a MTSN directory) on the isolated process server 104 that is attached to (and booting from), via step 502.

One of the first things a processing unit 106 will need to do after it is powered up is to determine which OS image it needs to boot. Using the preboot protocol boot capabilities, the processing unit 106 can determine its MAC address (specifically, which MAC address is being used to perform the preboot protocol boot in the case of systems with more than one network adapter). The processing unit 106 can check for the existence of a file with a unique name, for example, nnnnnnnn.MAC (where nnnnnnnn is the eight significant digits of its MAC address). If that file exists, the processing unit 106 can then determine its MTSN directory name (since the MTSN directory name is the content of the nnnnnnnn.MAC file), via step 504. Since the nnnnnnnn.MAC file and the MTSN directory are moved to isolated process servers 104 as a pair, the existence of the nnnnnnnn.MAC file also implies that the MTSN directory is also available on the isolated process server 104 that the processing unit 106 is attached to.

In addition, the MTSN directory and nnnnnnnn.MAC file can be moved to an isolated process server 104 if it does not already exist there, via step 506 (usually the first time a processing unit 106 is connected to an isolated process server 104) utilizing the capabilities of the network topology 100. A processing unit 106 under test performs this step at preboot time (since the information on the required OS Boot environment and the applicable OS Boot image for the current process step is saved in the MTSN directory). The processing unit 106 is able to perform the movement request without using the MTSN directory name (since the processing unit 106 may not be able to determine the MTSN directory name at preboot time). Since the MTSN directory contains real-time processing unit 106 specific data which is updated at various points as the processing unit 106 progresses through the process, there needs to be a way to ensure there is only one copy of an MTSN directory at any point in time, and that the processing unit 106 can access this MTSN directory.

The nnnnnnnn.MAC file and MTSN directory are originally created on the common control server 102 since that server may be the only server accessible to the floor control or server 108. During the process, the processing unit 106 can be connected to various isolated process servers 104. Since the processing units 106 do not have visibility to the common control server 102, and since any of the processing units 106 may be connected to any of the isolated process servers 104, the nnnnnnnn.MAC file and the MTSN directory must be moved to the isolated process server 104 that the processing unit 106 has been connected to. To eliminate the need for an operator to somehow indicate the processing unit 106 is being moved and started on a particular isolated process server 104 (to initiate a request for the movement of the MTSN directory), it would be very desirable for the processing unit 106 to be able to automatically request the movement of its MTSN directory.

Figure 6:
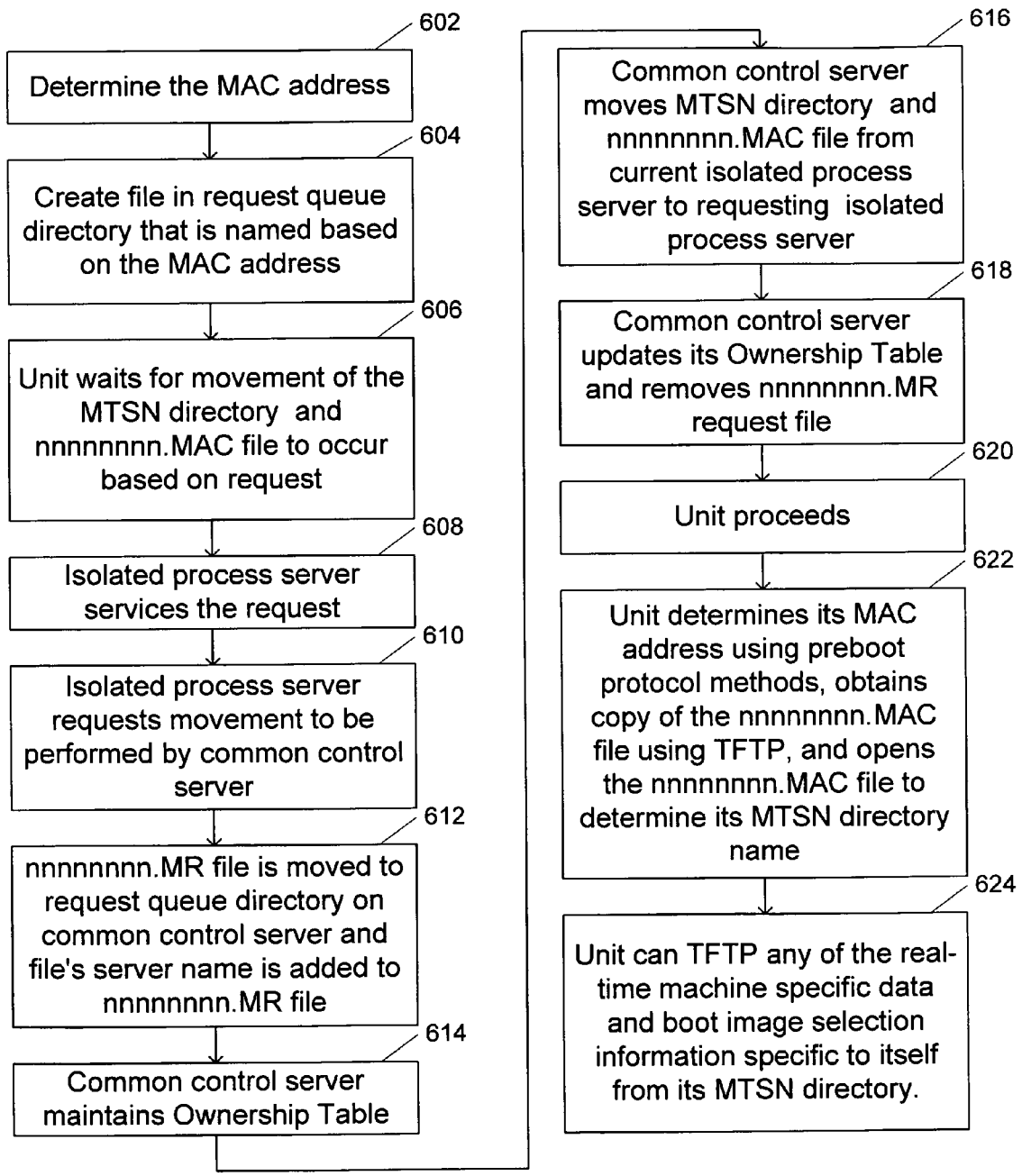
FIG. 6 illustrates a process for loading a boot image onto a processing unit after it has been set up.

FIG. 6 illustrates a process for loading a boot image onto a processing unit after it has been set up. Since the processing unit 106 cannot determine which OS environment and the applicable OS boot image to boot until the MTSN directory is present, the processing unit 106 cannot perform many operations. Referring to FIGS. 1 and 6 together, first the MAC address is determined, via step 602. Next, a file is created in a request queue 118 (on its current isolated process server 104) that is named based on the MAC address such as nnnnnnnn.MR (where again nnnnnnnn is the 8 significant digits of the MAC address), via step 604. The processing unit 106 can then wait for the movement of the MTSN directory and the nnnnnnnn.MAC file to occur based upon the request, via step 606 and 618.

Once the processing unit 106 places a request for movement of the MTSN directory and the nnnnnnnn.MAC files, the isolated process server 104 services the request, via step 608. The isolated process server 104 is unaware of other isolated process servers 104, and cannot simply copy the files directly. The isolated process server 104 then requests the movement to be performed by the common control server 102, via step 610. This is accomplished by moving the nnnnnnnn.MR file (which the processing unit 106 created on the request queue 118 of the isolated process server 104) up to the request queue 112 on the common control server 102, and by adding its server name to the nnnnnnnn.MR file (so that the common control server 102 can determine which isolated process server 104 is making the request), via step 612.

As before mentioned, the common control server 102 maintains an ownership table 110 that stores the MAC address, MTSN, Server Name that has current copy of the MTSN directory name, and a state (New, In Process, End Process, or Complete), via step 614.

The common control server 102 monitors its request queue 112, and upon seeing a nnnnnnnn.MR file, will move the MTSN directory and the nnnnnnnn.MAC file from their current isolated process server 104 to the requesting isolated process server 104 (moving them to the unique Storage Directory 122 and LOCAL MACINUSE files 120 respectively), via step 616. The common control server 102 will also update its ownership table 110, and remove the nnnnnnnn.MR request file, via step 618.

Once the MTSN directory and the nnnnnnnn.MAC file has been moved to the isolated process server 104 that the processing unit 106 is attached to, the processing unit 106 is able to proceed, via step 620. The processing unit 106 can determine its MAC address using preboot protocol methods, can obtain a copy of the nnnnnnnn.MAC file using TFTP, and can then open the nnnnnnnn.MAC file to determine its MTSN directory name, via step 622.

Once the processing unit 106 has determined its MTSN directory name, it can TFTP any of the real-time processing unit 106 specific data and boot image selection information specific to itself from its MTSN directory, via step 624.

This completes the process of loading the boot image onto the processing unit 106.

Figure 7:
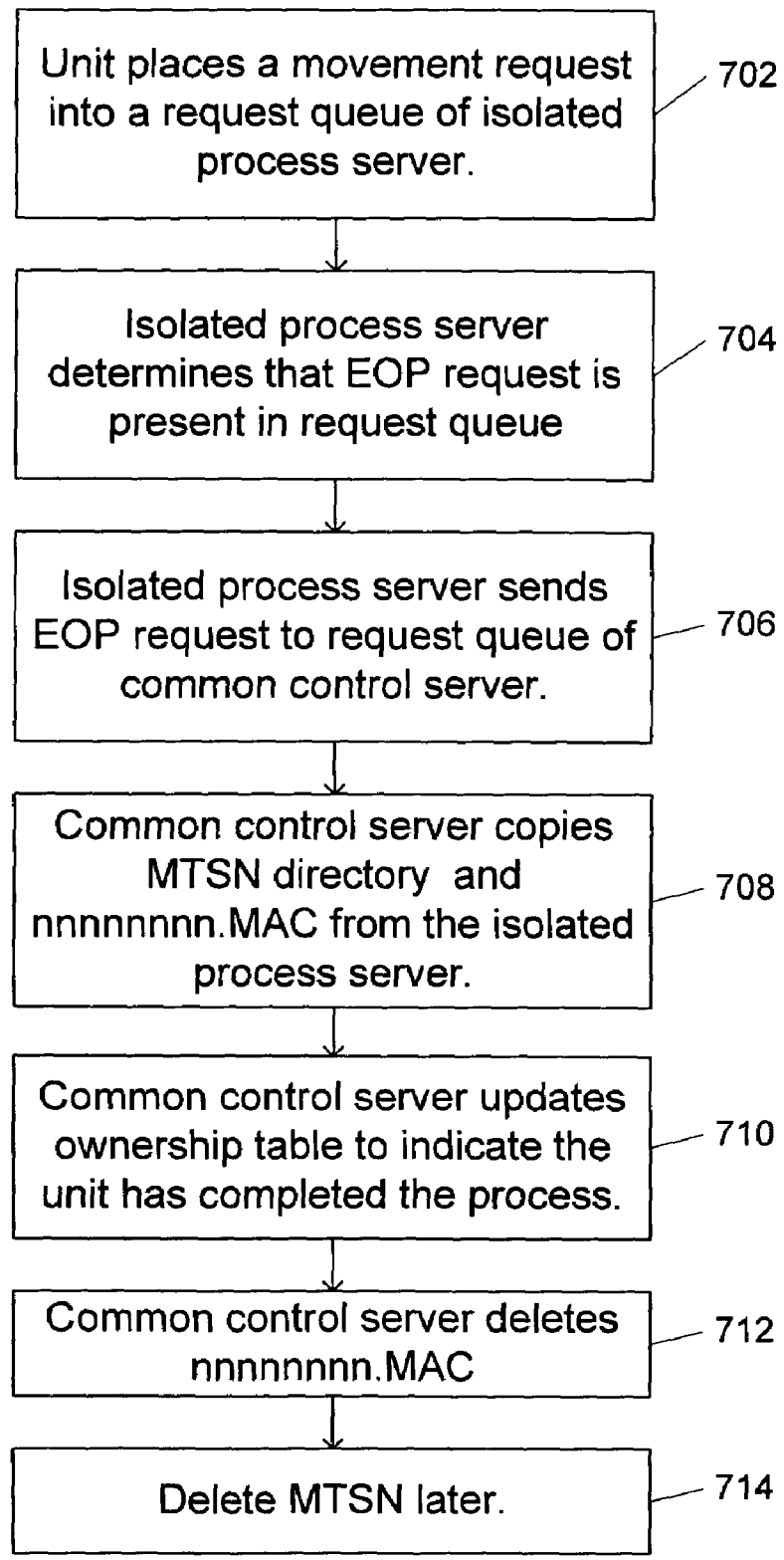
FIG. 7 is a flow chart which illustrates a process for releasing the MAC address of the processing unit after the boot image has been loaded.

FIG. 7 is a flow chart which illustrates a process for freeing up the MAC address of the processing unit after the boot image has been loaded. Referring to FIGS. 1 and 7 together, when the process is complete, the processing unit 106 can indicate that it will no longer be using its MTSN directory and its nnnnnnnn.MAC file by placing a movement request (in this case an End-of-Process request) into the request queue 118 (on its current isolated process server 104). This type of image is very similar to the movement request, but instead of requesting the MTSN directory and nnnnnnnn.MAC be moved down to the requesting isolated process server 104, the request is that they are moved from the isolated process server 104 to the common control server 102 (so that the floor control system 108 can obtain required information such as process logs and information).

This type of request can be differentiated by several means such as providing a different naming convention for the file (such as using nnnnnnnn.EOP file name), or by including contents internal to the file indicating the request is for an End-of-Process transaction).

The isolated process server 104 will determine that there is an End-of-Process request in its request queue 118, via step 704, and will then move the request up to the common control server 102's request queue 112. The common control server 102 then determines that this request is an End-of-Process request (based on, for example, the nnnnnnnn.EOP file name extension or other means, via step 706). The common control server 102 will then copy the MTSN directory and nnnnnnnn.MAC file from the isolated process server 104, via step 708.

The common control server 102 also updates its Ownership Table 110 to indicate that the processing unit 106 has completed the process, via step 710, and is awaiting the results to be obtained by the floor control server 108. It is important that the common control server 102 deletes the nnnnnnnn.MAC as soon as it is certain the processing unit 106 has completed the process, via step 712, since the network card that had been used by the processing unit 106 has completed the process, the MTSN directory should be removed to free up storage space on the common control server 102, via step 714. It is usually beneficial to allow a period of time (for instance a week or two) to pass before removing the MTSN directory in case an operator or engineer wants to review the contents for debugging purposes.

CONCLUSION

The system and method in accordance with the present invention provides the following advantageous features.

1. Movement of processing units between servers within the process (by creating, caching and moving the MTSN directory).
2. OS boot image selection (by providing a mechanism for requesting and moving the MTSN directory during the processing units preboot protocol pre-boot phase)

3. Self-determination of a unique identifier for a processing unit (by using a time-period unique identifier which uses the MAC address as the unique identifier, and allows for the same MAC address to be used on multiple processing units by providing a means to allocate/deallocate the MAC address.
4. Association of the unique identifier with information supplied by a floor control system (by binding/unbinding the MAC address with the MTSN directory name).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for moving processing unit specific data during a preboot procedure, the system comprising:
    a first server;
    a plurality of second servers, the plurality of second servers being coupled to the first server, but not being coupled to each other; and
    at least one processing unit coupled to each one of the plurality of second servers wherein the at least one processing unit accesses only the second server to which the at least one processing unit coupled to,
    wherein at least one processing unit is movable between the plurality of second servers during the preboot procedure by creating, storing and moving information required by the at least one processing unit during the preboot procedure between the plurality of second servers under control of the first server.

2. The system of claim 1 wherein:
    the first server comprises a common control server operable to create an association file that associates a media access control (MAC) address of the at least one processing unit with a unique machine type serial number (MTSN) directory name; and
    the information required by the at least one processing unit during the preboot procedure comprises the association file.

3. The system of claim 2, wherein the common control server includes:
    an ownership table operable to store a name of one of the plurality of second servers that currently has a copy of a MSTN directory corresponding to the at least one processing unit;
    a global request queue operable to store a request from one of the plurality of second servers for the copy of the MSTN directory corresponding to the at least one processing unit;
    a global association file storage unit operable to store a plurality of global directory name association files; and
    a first storage directory unit operable to store a plurality of MTSN directories including the copy of the MTSN directory corresponding to the at least one processing unit.

4. The system of claim 3, wherein each of the second servers comprises an isolated process server.

5. The system of claim 4, wherein each of the isolated process servers includes:
    a local request queue operable to store a request from the isolated process server for the copy of the MSTN directory corresponding to the at least one processing unit when the at least one processing unit is coupled thereto;
    a local association file storage unit operable to store a plurality of local directory name association files; and
    a second storage directory operable to store a plurality of MSTN directories including the copy of the MSTN directory corresponding to the at least one processing unit.

6. The system of claim 5, wherein the at least processing unit is prepared for the preboot procedure including:
    creating the copy of the MTSN directory corresponding to the at least one processing unit and the MSTN directory name through the common control server; and
    associating the copy of the MSTN directory corresponding to the at least one processing unit with the MSTN directory name; and
    storing the association of the copy of the MSTN directory corresponding to the at least one processing unit and the MSTN directory name in the first server via the isolated process server that the at least one processing unit is coupled to.

7. The system of claim 6, wherein the MSTN directory name is based upon unit type, serial number or other identifier associated with the at least one processing unit.

8. The system of claim 7, which further comprises a third server coupled to the first server for providing order information to the first server.

9. The system of claim 8, wherein the third server comprises an order control server.

10. The system of claim 9, wherein the at least one processing unit is operable to obtain the copy of the MSTN directory corresponding to the at least one processing unit using trivial file transfer protocol (TFTP).

11. The system of claim 6, wherein a name of the association file corresponds to eight significant digits of the MAC address of the at least one processing unit.

12. The system of claim 6, wherein movement requests of the association file among the plurality of isolated process servers are based on the MAC address of the at least one processing unit.

13. The system of claim 1, wherein the information required by the at least one processing unit during the preboot procedure comprises one or more of sequence of steps to be performed by the at least one processing unit during the preboot procedure, real-time information corresponding to the one or more sequence of steps that have been processed, or information corresponding to operating system boot image selection by the at least one processing unit.

14. A method for moving processing unit specific data to a processing unit during a preboot procedure, the method comprising:
    creating a copy of a machine type serial number (MTSN) directory corresponding to processing unit through a first server, the copy of the MTSN directory having a MTSN name and including required information to be run by the processing unit during the preboot procedure;
    associating a media access control (MAC) address corresponding to the processing unit and the MTSN directory name within an association file;
    storing the association file in the first server; and
    providing the association file to the processing unit through one of a plurality of second servers that are coupled to the first server, wherein each of the plurality of second servers are not coupled to one another, the plurality of second servers being controlled by the first server, wherein during the preboot procedure the processing unit is movable among the plurality of second servers coupled to the first server and the first server is operable to provide the association file a given second server to which the processing unit is coupled to.

15. The method of claim 14, wherein associating a MAC address corresponding to the processing unit and the MSTN directory name comprises:

scanning in the MSTN directory name; and scanning in the MAC address corresponding to the processing unit.

16. The method of claim 14, wherein associating a MAC address corresponding to the processing unit and the MSTN directory name comprises:

scanning in the MSTN directory name; and sniffing the MAC address corresponding to the processing unit from an IP packet.

17. The method of claim 14, wherein the MSTN directory name comprises a machine type serial number (MSTN).

18. The method of claim 17, wherein providing the copy of the MSTN directory to the processing unit comprises:

setting up the processing unit to receive a boot image;

loading the boot image onto the processing unit; and releasing the MAC address corresponding to the processing unit after having loaded the boot image onto the processing unit.

19. The method of claim 18, wherein a name of the association file corresponds to eight significant digits of the MAC address corresponding to the processing unit.

20. The method of claim 19, wherein setting up the processing unit comprises:

determining if the association file is located in the isolated process server to which the processing unit is coupled to;

moving the association file to isolated process to which the processing unit is coupled to server if the MAC file does not exist therein;

determining the MSTN directory name associated with the association file; and obtaining the copy of the MSTN directory corresponding to processing unit based on the MSTN directory name.

* * * * *